United States Patent Office 3,072,681
Patented Jan. 8, 1963

---

3,072,681
B-NORSTEROID DERIVATIVES
James F. Kerwin, Broomall, Pa., assignor to Smith Kline & French Laboratories, Philadelphia, Pa., a corporation of Pennsylvania
No Drawing. Filed Oct. 28, 1959, Ser. No. 849,166
4 Claims. (Cl. 260—343.2)

This invention relates to a new series of ring B modified steroid compounds. More specifically this invention relates to B-norprogesterone or testosterone derivatives.

These compounds have surprisingly retained activity qualitatively the same as each parent compound despite such a radical change as making the B ring a 5 membered moiety. Therefore these compounds, for example, have progestational activity in the B-norprogesterone series or anabolic activity in the B-nor-17α-alkyltestosterone series. Each of the compounds furthermore is useful as an intermediate for preparing more highly substituted analogues in its respective therapeutic family of compounds.

The compounds of this invention, therefore, are unique in having a 5 membered ring in the B-position and are represented by the following fundamental formula:

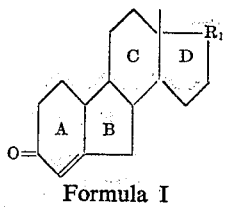

Formula I $R_1$ is 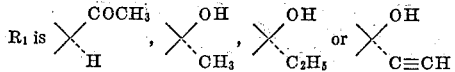

The compounds are prepared from intermediates represented by the following formula:

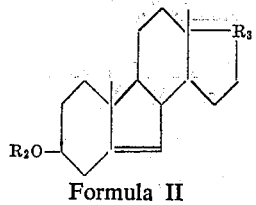

Formula II in which $R_2$ is hydrogen or lower acyl derived from a saturated hydrocarbon carboxylic acid of less than 7 carbon atoms, preferably acetyl, and $R_3$ is keto or

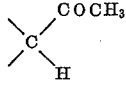

The intermediate compounds are prepared by the following series of reactions in which Ac is acyl preferably acetyl.

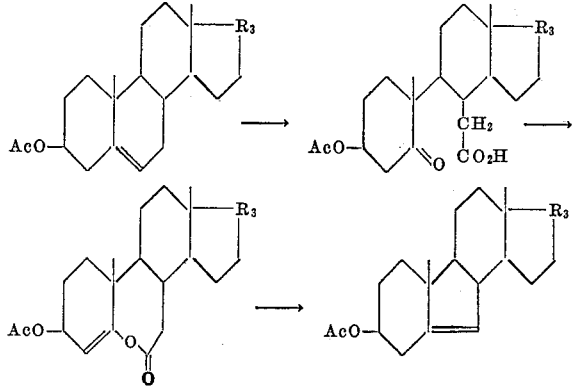

The testosterone based derivatives of Formula I in which $R_1$ is an α-alkyl-β-hydroxymethylene moiety are prepared by adding a proper Grignard reagent to the acylated intermediate shown above in Formula II in which $R_3$ is keto. The acetyl protecting groups are removed and the resulting 3-hydroxy group oxidized under Oppenauer conditions to give the desired compound of Formula I. Alternatively, the final oxidation step can be carried out with chromic acid-acetone as described by U.S. Patent 2,888,468.

The following examples are illustrative of the compounds of this invention.

Example 1

A solution of 25.0 g. of pregnenolone acetate in 300 ml. of glacial acetic acid is added to a solution of 22.8 g. of chromium trioxide in 90 ml. of 50% aqueous acetic acid over 2.5 hours. After stirring for 3 hours at about 55° C., the reaction mixture is quenched with 20 ml. of methanol, then 1 l. of water. The quenched mixture is extracted with methylene chloride. The organic extracts are combined and washed with 5% sodium carbonate until basic. The basic wash solutions are acidified with concentrated hydrochloric acid and extracted into ether. The ether is evaporated to leave a yellow oil, 3-acetoxy-5-oxo-5,6-seco-pregnan-20-on-6-oic acid.

The methylene chloride layer is washed and evaporated to give 7-keto-pregnenolone acetate, M.P. 148–150° C.

A mixture of 10.4 g. of the yellow oily acid, 50 ml. of anhydrous pyridine and 10 ml. of benzoyl chloride is reacted at room temperature for 49 hours then quenched in 400 ml. of water. The separated brown oil is extracted into ether. The washed ethereal extract is evaporated to give 3-acetoxy-5-hydroxy-5,6-seco-4-pregnen-6-oic acid, 5,6-lactone, M.P. 163–165° C.

A sample of 2.7 g. of the lactone is heated at 180° C. until the evolution of gas ceases. The recrystallized residue, M.P. 120–121° C. is B-norpregnenolone acetate. A mixture of 2.9 g. of the acetate, 150 ml. of methanol, 3.5 g. of potassium carbonate and 25 ml. of water is heated at reflux for 2 hours, partly evaporated under reduced pressure, diluted with water and filtered to give B-norpregnenolone, M.P. 140–141° C.

A mixture of 1.9 g. of the pregnenolone, 4.0 g. of aluminum isopropoxide, 200 ml. of anhydrous toluene and 10 ml. of cyclohexanone is heated at reflux for 2 hours. The residue is taken into methylene chloride. The product isolated from the extract is B-nor-progesterone, M.P. 140–143° C.

Example 2

A stirred solution of 25.0 g. of dehydroepiandrosterone acetate, prepared by acetylation in pyridine with acetic anhydride, in 400 ml. of glacial acetic acid is added to a solution of 22.8 g. of chromium trioxide in 90 ml. of 50% aqueous acetic acid in 2 hours at 55–60° C. The reaction mixture is quenched as in Example 1 then extracted with methylene chloride which is in turn extracted with sodium carbonate solution. The alkaline extracts are acidified with hydrochloric acid and extracted with ether to give 3-acetoxy-5-oxo-5,6-seco-androstan-6-oic acid as a yellow oil. The ketone, 7-keto-dehydroepiandrosterone acetate, is obtained by working up the methylene chloride layer, M.P. 185–187° C.

A mixture of 15.7 g. of the acid, 50 ml. of pyridine and 10 ml. of benzoyl chloride is reacted at room temperature for 41 hours. After quenching in water and extraction with ether the desired 3-acetoxy-5-hydroxy-5,6-seco-4-androsten-6-oic acid, 5,6-lactone, M.P. 162–164° C. is obtained. A sample of 10.8 g. of the lactone is heated at 183° C. until gas evolution stops. After recrystallization from methanol, B-nor-dehydroepiandrosterone acetate, M.P. 140–142° C. is obtained.

Example 3

A solution of 8.0 g. of B-nor-dehydroepiandrosterone acetate of Example 2 in 250 ml. of dry benzene is reacted with a slight excess of 3 M methyl magnesium bromide in ether reagent (65–70 ml.) over 15 minutes. After a reflux period of 2 hours the mixture is quenched over ice, acidified with concentrated hydrochloric and extracted with methylene chloride. After evaporation of the extracts and recrystallization of the residue from acetone 17α-methyl-17β,3β-dihydroxy-B-nor-5-androstene, M.P. 203–204° C. is obtained.

A mixture of 5 g. of this compound, 10 g. of aluminum isopropoxide, 500 ml. of anhydrous toluene and 27 ml. of cyclohexanone is heated at reflux for 2 hours, cooled and washed. The organic layer is steam distilled. The residue is taken into methylene chloride which is dried, washed and evaporated to give B-nor-17-methyltestosterone, M.P. 150–153° C.

Example 4

A solution of 2 g. of B-nor-dehydroepiandrosterone acetate, from Example 2 in 100 ml. of benzene is reacted with an excess of ethyl magnesium iodide in ether. After refluxing for 2 hours, the mixture is quenched over ice, acidified and the product isolated by methylene chloride extraction to give 17α-ethyl-17β-hydroxy-B-nor-dehydroepiandrosterone. This compound (1 g.) together with 2 g. of aluminum isopropoxide, 100 ml. of toluene and 3 ml. of cyclohexanone is heated at reflux for 3 hours. After steam distillation, extraction of the residue with methylene chloride gives B-nor-17-ethyltestosterone.

Example 5

A mixture of 5 g. of potassium reacted with 100 ml. of α-amyl alcohol and 100 ml. of dry ether is cooled and dry acetylene flushed through the mixture for 2 hours. B-nor-dehydroepiandrosterone acetate (5 g.) is added and the flushing continued for 4 hours. The ice bath is removed and acetylene flushing continued for 12 hours. After addition of 10% ammonium chloride solution and 300 ml. of water, the organic layer is removed in vacuo. The remaining water is decanted. The residue is taken through benzene purified and recrystallized to give B-nor-17α-ethinyl-17β-hydroxydehydroepiandrosterone. Reaction of 500 mg. of this compound with aluminum isopropoxide under Oppenauer conditions as described above gives B-nor-17-ethinyltestosterone.

What is claimed is:
1. B-norprogesterone.
2. B-nor-17α-ethinyltestosterone.
3. A compound of the formula:

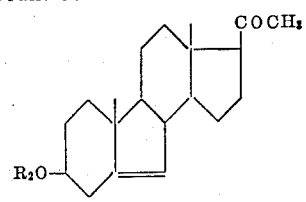

in which $R_2$ is a member selected from the group consisting of hydrogen and acetyl.

4. A compound of the formula:

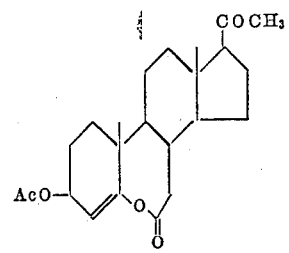

in which Ac is acetyl.

References Cited in the file of this patent

Karrer: Organic Chemistry, Elsevier, New York (1946), p. 24.
Dauben et al.: Jour. Amer. Chem. Soc., vol. 78, September 20, 1956, pp. 4736–4743.
Joska et al.: Chemistry and Industry, December 13, 1958, pp. 1665 and 1666.
Boswell et al.: Bull. Soc. Chim., France, November–December 1958, p. 1598.
Rull et al.: Bull. Soc. Chim., France November–December 1958, pp. 1581–1586.
Fieser et al.: "Steroids," Reinhold, New York (1959), p. 520.
Fieser et al.: "Steroids," Reinhold Pub. Corp., N.Y. (April 7, 1959), pp. 445, 520.